Figure 1:
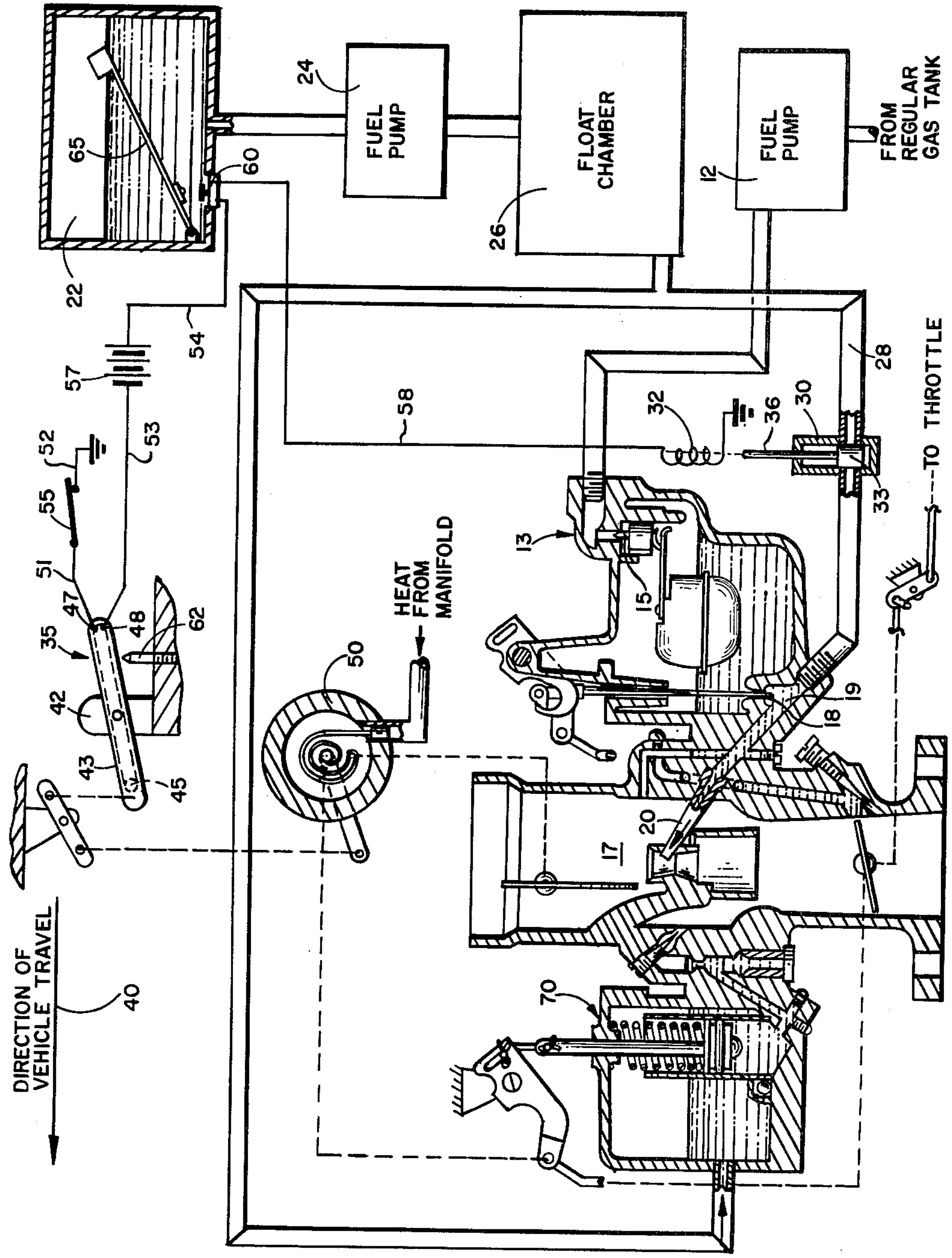

Dec. 14, 1965 H. F. BUNZE 3,223,390

DUAL FUEL CARBURETION SYSTEM

Filed May 29, 1962

2 Sheets-Sheet 1

INVENTOR.
HARRY F. BUNZE
BY Edward A. Sokolski
ATTORNEY

DUAL FUEL CARBURETION SYSTEM

Filed May 29, 1962 2 Sheets-Sheet 2

INVENTOR.
HARRY F. BUNZE
BY Edward A. Sokolski
ATTORNEY

United States Patent Office 3,223,390

Patented Dec. 14, 1965

1

2

3,223,390

DUAL FUEL CARBURETION SYSTEM

Harry F. Bunze, Rolling Hills Estates, Calif.
(849 Serpentine Drive, Redlands, Calif.)

Filed May 29, 1962, Ser. No. 198,511
5 Claims. (Cl. 261—18)

This invention relates to a dual fuel carburetion system and more particularly to such a system in which high octane or regular fuel is alternatively fed to the carburetor depending on engine power requirements and temperature.

In modern high compression engines, high octane fuel is utilized to prevent engine detonation at times when the engine power demands are relatively high. Under normal cruising conditions and when the engine is cold, such high octane fuel is not required and regular fuel will function just as well. Thus, in a normal day of driving, regular fuel will function as well as high test most of the time, with the high octane fuel only being required when accelerating, climbing or when the engine is very hot. It is apparent that a great saving in fuel expense can be effected by providing means for utilizing high octane fuel only at the times when it is needed and feeding regular fuel to the carburetor at all other times. In addition, engine efficiency can be increased by using regular fuel under normal cruising conditions.

This problem has been recognized, and devices have been developed in the prior art to effect dual fuel carburetion in accordance with the power demands of the engine. These devices, however, all depend on engine vacuum, manifold pressure or other engine parameters, and therefore do not function until the engine itself has suffered a deficiency in attempting to satisfy the power demands imposed on it. They further tend to have poor response to continuous acceleration under constant throttle. This means that there is a lag in the response to such power demands. In addition, such prior art devices tend to be over-complicated and difficult to install in modifying existing engines.

The device of this invention overcomes the shortcomings of prior art dual fuel carburetion devices by providing simple yet highly effective means for alternatively feeding high octane or regular fuel to the carburetor, such means being adapted to feed high octane fuel in response to predetermined combinations of positive acceleration and upward incline of the vehicle in the direction of travel.

In one of the embodiments of the device of the invention, this result is achieved by providing separate tanks for anti-knock and regular fuel repectively. Switch means responsive to positive accelerations of the vehicle, vehicle climbing conditions, and engine temperature alternatively connects the output of a float chamber containing anti-knock fuel for predetermined minimum combined magnitudes of these parameters or connects the output of a regular fuel float chamber when such minimum combined magnitudes are not present.

The switch means in this first embodiment comprise a container having a pair of electrical contact at one end thereof. An electrically conductive proof mass which may be a small ball of mercury is held in the container with freedom of motion to either end thereof. The container is normally held at a fixed angle of incline with respect to the vehicle, with the end of the container at which the contacts are positioned being opposite the direction of vehicle travel. With forward acceleration of the vehicle, the mercury ball will tend to move towards the contacts. The ball will tend to travel similarly when the vehicle is climbing. The amount of acceleration and/or climbing required to move the ball so as to close the contacts is obviously a function of the relationhip of these two inputs to the force of gravity acting on the ball. The incline of the container can be pre-adjusted to produce the desired switching as necessary for the particular engine involved and the operating conditions desired. The incline of the container is also varied as a function of the engine temperature which as noted also affects the engine's fuel requirements.

In another embodiment of the device of the invention, a vessel with a combination of anti-knock fluids therein such as tetraethyl lead is utilized to convert the regular fuel to anti-knock fuel where necessary. A gravity and acceleration sensitive switch is used to impel a spray of liquid from the container into the carburetor where it is added to the regular fuel when the vehicle is operating under predetermined minimum acceleration and/or climbing conditions.

It is therefore an object of this invention to provide an improved dual fuel carburetion system which alternatively provides regular or anti-knock fuel to the carburetor as required.

It is a further object of this invention to effect economy in the cost of operating high compression gasoline engines.

It is another object of this invention to provide a simple system for selectively feeding anti-knock or regular fuel to a carburetor in response to vehicle acceleration and climbing conditions.

It is a still further object of this invention to improve the efficiency of operation of high compression gasoline engines.

Figure 2:
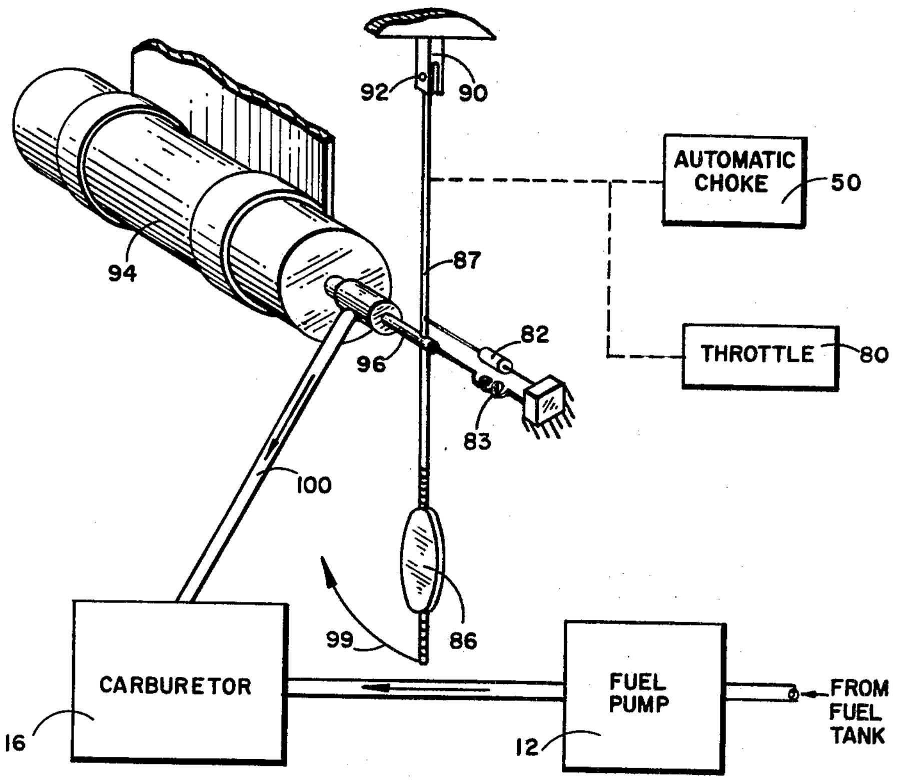
Figure 3:
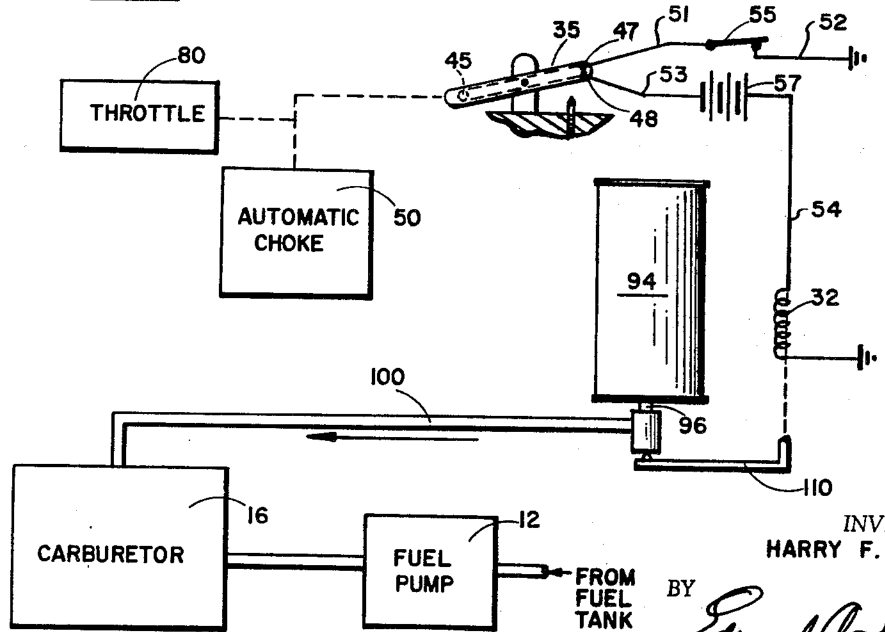

Other objects of this invention will become apparent from the following description taken in connection with the accompanying drawings of which FIG. 1 is a schematic diagram of a first embodiment of the device of the invention;

FIG. 2 is a schematic diagram of a second embodiment of the device of the invention;

And FIG. 3 is a a schematic diagram of a third embodiment of the device of the invention.

Referring to FIG. 1, a first embodiment of the device of the invention is illustrated. Regular fuel is pumped by fuel pump 12 from the regular gas tank (not shown) to float chamber 13. Float chamber 13 will fill with regular gas to a predetermined level at which float valve 15 will shut off further flow into the chamber from the regular gas tank. The fuel is metered in normal fashion from float chamber 13 to venturi 17 through metering valve 18 and jets 20.

Anti-knock fuel is stored in auxiliary gas tank 22 and is pumped by fuel pump 24 into float chamber 26. Float chamber 26 is similar in construction to float chamber 13 and is maintained at a slightly higher gravity level than float chamber 13. The fuel from float chamber 26 is fed via fuel line 28 to the outlet 19 at the bottom of float chamber 13. Interposed in fuel line 28 is valve 30. Valve 30 is controlled by solenoid 32. The valve is shown in the closed position as it would be when solenoid 32 is not being actuated. Under such circumstances, piston 33 blocks the flow of fuel from float chamber 26 to float chamber 13. Under such conditions only regular fuel is fed to float chamber 13.

An acceleration sensitive switch 35 which is sensitive to accelerations of the vehicle in the direction of arrow 40 and incline of the vehicle when it is climbing is provided. This switch is pivotally mounted on a support 42 which is fixed attached to the vehicle. Switch 35 is adjusted to a predetermined angle of incline with respect to the vehicle when the engine is hot. This angle can be determined for each vehicle for optimum operation of the device of the invention. Switch 35 comprises a container 43 having an electrically conductive mass 45 which is free to move therein and a pair of electrical contacts 47 and 48 mounted at one end thereof. Conductive mass 45 may be a ball of mercury. Switch 35 is mechanically coupled to automatic choke 50 so that when the engine is cold the choke will maintain switch 35 at a relatively large angle of incline with respect to the vehicle with the side of the switch opposite the switch contacts being urged downward by the choke linkage. Under such cold engine conditions, the mass 45 will be prevented from closing contacts 47 and 48 even under conditions of high acceleration and when the vehicle is climbing.

Switch contact 47 is connected through line 51, ignition switch 55, and line 52 to ground while contact 48 is connected through line 53 to the negative terminal of battery 57. The positive terminal of battery 57 is connected through line 54, microswitch 60, which is normally closed, and line 58 to solenoid 32. It can be seen, that when mass 45 moves to the right side of container 43 to close contacts 47 and 48 that a circuit is completed to actuate solenoid 32 provided that microswitch 60 is not being actuated and ignition switch 55 is closed. Solenoid 32 is a conventional electrical solenoid which magnetically draws shaft 36 upward to open valve 30 when the solenoid coil is energized, valve 30 being held closed by suitable means such as a conventional spring when the solenoid coil is not energized.

The angle of incline of switch 35, as already noted, is responsive to automatic choke 50. With the choke cold, this angle of incline is maintained high. As the choke warms up in response to heat from the manifold, this angle of incline is decreased as manifold temperature increases. A minimum incline angle is maintained by means of stop pin 62 which prevents further travel of container 43 when it strikes this pin. Let us assume that the vehicle is accelerated in the direction of arrow 40. The force of this acceleration will tend to cause mass 45 to move towards contacts 47 and 48. If the vehicle should start to climb a hill, the force of gravity will have a similar effect. The incline of switch 35 can be preadjusted so that a predetermined minimum acceleration or climb angle or combination of these two conditions will cause the contacts to be closed.

When the contacts of switch 35 are closed, solenoid 32 which is a conventional electrical solenoid is energized and shaft 36 draws piston 33 upwards to open valve 30. Under such conditions the fuel from float chamber 26 is permitted to pass into venturi 17 via jets 20. Float chamber 26 is maintained at a higher gravity level than chamber 13 and therefore the anti-knock fuel flow from chamber 26 to the venturi will be favored over regular fuel flow from chamber 13. Float valve 15 will prevent the flow of regular fuel into chamber 13 as long as the anti-knock fuel is being fed into the venturi. This is because the higher pressure level of chamber 26 in view of its higher gravity level will result in substantially all the flow being from this chamber with chamber 13 rapidly filling up to close float valve 15. Therefore, when float chamber 26 is connected to jets 20, only the anti-knock fuel from tank 22 will be fed to the venturi and regular fuel supply will be cut off. When auxiliary tank 22 is empty, float mechanism 65 will actuate microswitch 60 and thereby interrupt the path from battery 57 to solenoid 32. This will maintain operation from the regular gas tank and will cause valve 30 to cut off float chamber 26 from communication with the venturi 17.

Fuel is also fed from float chamber 26 to the bottom of accelerating pump 70. This pump receives only anti-knock fuel from float chamber 26 and is not connected to receive regular fuel. Acceleration pump 70 operates and is connected in conventional fashion except for the feeding of fuel from tank 22 to the bottom end thereof with the elimination of any connection to the regular fuel source.

Referring now to FIG. 2, a second embodiment of the device of the invention is schematically illustrated. Regular fuel is pumped from the fuel tank (not shown) by fuel pump 12 to carburetor 16. The fuel enters the carburetor from line 100 through an appropriate jet in the same fashion as shown in FIG. 1. Mass 86 is pendulously suspended from the frame of the vehicle by means of shaft 87 which is pivotally attached to mount 90 by means of pin 92. A pressurized spray container 94 which may be an aerosol type container of the type generally available commercially and having a push button actuated valve (not shown) is fixedly attached to the frame of the vehicle. Shaft 87 is connected to the actuator for the spray can (not shown) by means of coupler 96. Spray can 94 is filled with an anti-knock fluid such as tetraethyl lead, aniline, or methyl lead compounds.

When the vehicle experiences a predetermined minimum acceleration, mass 86 will move sufficiently relative to the vehicle frame in the direction of arrow 99 to cause coupler 96 to actuate the spray can actuator. This will cause anti-knock fluid spray to be fed through line 100 to carburetor 16 where it is mixed with the regular gasoline to convert this gasoline to anti-knock fuel. Line 100 is preferably connected to a vacuum line available at the base of any conventional carburetor. When the vehicle is climbing at a predetermined minimum incline angle or with predetermined combinations of acceleration and incline angle, the spray can will be similarly actuated. Thus, the regular fuel is converted to anti-knock fuel when the demand exists while at other times regular gasoline is utilized. Oscillation of the pendulously suspended mass is minimized by means of spring 83 connected on one end thereof to coupler 96 and the other end thereof to the frame of the vehicle operating in conjunction with dashpot 82 which is a conventional fluid dashpot connected in parallel with the spring.

Automatic choke 50 is mechanically coupled to shaft 87 so that when the engine is cold, the shaft will be biased at a position where actuation of the spray can will not occur even with high acceleration and under climbing conditions. This biasing changes as the choke warms up to make for easier actuation of the can.

The vehicle throttle 80 is also mechanically linked to shaft 87 so that when the throttle is pushed close to wide open, the spray can will be actuated to provide anti-knock fuel. It is to be noted that the pendulously suspended actuator illustrated in FIG. 2 is only exemplary and other types of pendulous actuating schemes may be used to equal advantage. For example the spray can 94 could be pendulously suspended from the vehicle frame with shaft 87 being fixedly attached to the vehicle with the can being urged towards the shaft under acceleration and/or climbing conditions to actuate the spray nozzle.

Referring now to FIG. 3, a third embodiment of the device of the invention is illustrated. In this embodiment, the same general technique as in the embodiment shown in FIG. 2 is utilized to obtain anti-knock fuel by the actuation of a spray can containing anti-knock fluid to provide a spray of such fluid down line 100 to carburetor 16. In the embodiment of FIG. 3, however, a switch 35 similar to the switch of the embodiment of FIG. 1 is utilized in place of the pendulous actuator to produce the desired end results. With predetermined combinations of vehicle acceleration and climbing, mass 45 closes contacts 47 and 48 to actuate solenoid 32 from battery 57 through lines 51–54. Solenoid 32, which operates in the same fashion as the solenoid described in connection with FIG. 1, is magnetically coupled to shaft 110 which is fabricated of magnetic material to draw this shaft towards it when it is actuated which in turn causes coupler 96 to actuate spray can 94 which is similar to the spray can described in connection with FIG. 2. Automatic choke 50 and throttle 80 are connected to switch 35 to operate in the same manner as described in connection with FIG. 1.

With the embodiments of FIGS. 2 and 3, only a small amount of spray is required from can 94 to achieve the desired end results during acceleration and/or climbing. The can may therefore be utilized for a fairly long period of time before it need be replaced or refilled.

The device of this invention thus provides a simple yet highly effective way of utilizing fuel at maximum efficiency, and minimizing the requirements for anti-knock fuel without sacrificing engine performance. With an operative embodiment of the device of the invention constructed in accordance with FIG. 1, in tests made on long distance trips, anti-knock fuel was consumed at a ratio of 1:20 to the consumption of regular fuel in a high compression engine without any sacrifice of engine performance as compared to when anti-knock fuel was utilized exclusively.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A dual fuel carburetion system for use in a vehicle engine adapted to selectively provide regular or anti-knock fuel to the engine carburetor in accordance with the forward acceleration and incline conditions of said vehicle comprising a carburetor,
a source of regular fuel,
a source of anti-knock fuel,
separate fuel lines interconnecting each of said fuel sources and said carburetor,
a valve interposed in said anti-knock connecting fuel line,
electrically responsive actuator means operatively connected to said valve,
a power source,
and acceleration sensitive electrical switch means comprising a mercury switch interposed between said power source and said actuator means,
said switch means closing in response to predetermined combinations of vehicle incline and forward acceleration,
whereby when said switch means is closed said valve is opened to permit anti-knock fuel to pass to said carburetor.

2. The system as recited in claim 1 wherein said source of anti-knock and regular fuel include separate float chambers containing anti-knock and regular fuel respectively, said anti-knock fuel float chamber being maintained at a slightly higher level than said regular fuel float chamber.

3. The system as recited in claim 1 wherein said switch means comprises a container attached to said vehicle having a pair of electrical switch contacts contained therein.

4. A dual fuel carburetion system for use in a vehicle engine adapted to selectively provide regular or anti-knock fuel to the engine carburetor in accordance with the acceleration and incline conditions of said vehicle comprising a carburetor,
a source of regular fuel,
a source of anti-knock fuel,
separate fuel lines interconnecting each of said fuel sources and said carburetor,
electrically responsive actuator means operatively connected to actuate the flow of anti-knock fuel to said carburetor,
a power source, and
acceleration sensitive electrical switch means comprising a mercury switch interposed between said power source and said actuator means,
said switch means closing in response to predetermined combinations of vehicle incline and acceleration,
whereby when said switch means is closed anti-knock fuel passes to said carburetor.

5. A dual fuel carburetion system for use in a vehicle engine comprising a carburetor, means for feeding regular fuel to said carburetor, and means for selectively providing anti-knock fuel in said carburetor in response to predetermined combinations of acceleration of said vehicle and upward incline of said vehicle in the direction of travel, comprising a source of anti-knock fluid,
an electrical switch mounted on said vehicle including a container having an electrically conductive liquid mass contained therein for freedom of motion and a pair of electrical contacts fixedly mounted at one end thereof,
a solenoid,
a power source connected to said solenoid with said switch contacts interposed therebetween,
said liquid mass closing said contacts in response to predetermined combinations of acceleration and incline of said vehicle to actuate said solenoid, and
means responsive to said solenoid for feeding anti-knock fluid from said fluid source to said carburetor.

References Cited by the Examiner

UNITED STATES PATENTS

| | | | |
|---|---|---|---|
| 2,252,416 | 8/1941 | Schwarz | 123—127 |
| 2,554,612 | 5/1951 | Bills et al. | 261—18 |
| 2,836,403 | 5/1958 | Volcher | 261—18 |

HARRY B. THORNTON, *Primary Examiner.*

HERBERT L. MARTIN, *Examiner.*